Figure 1:
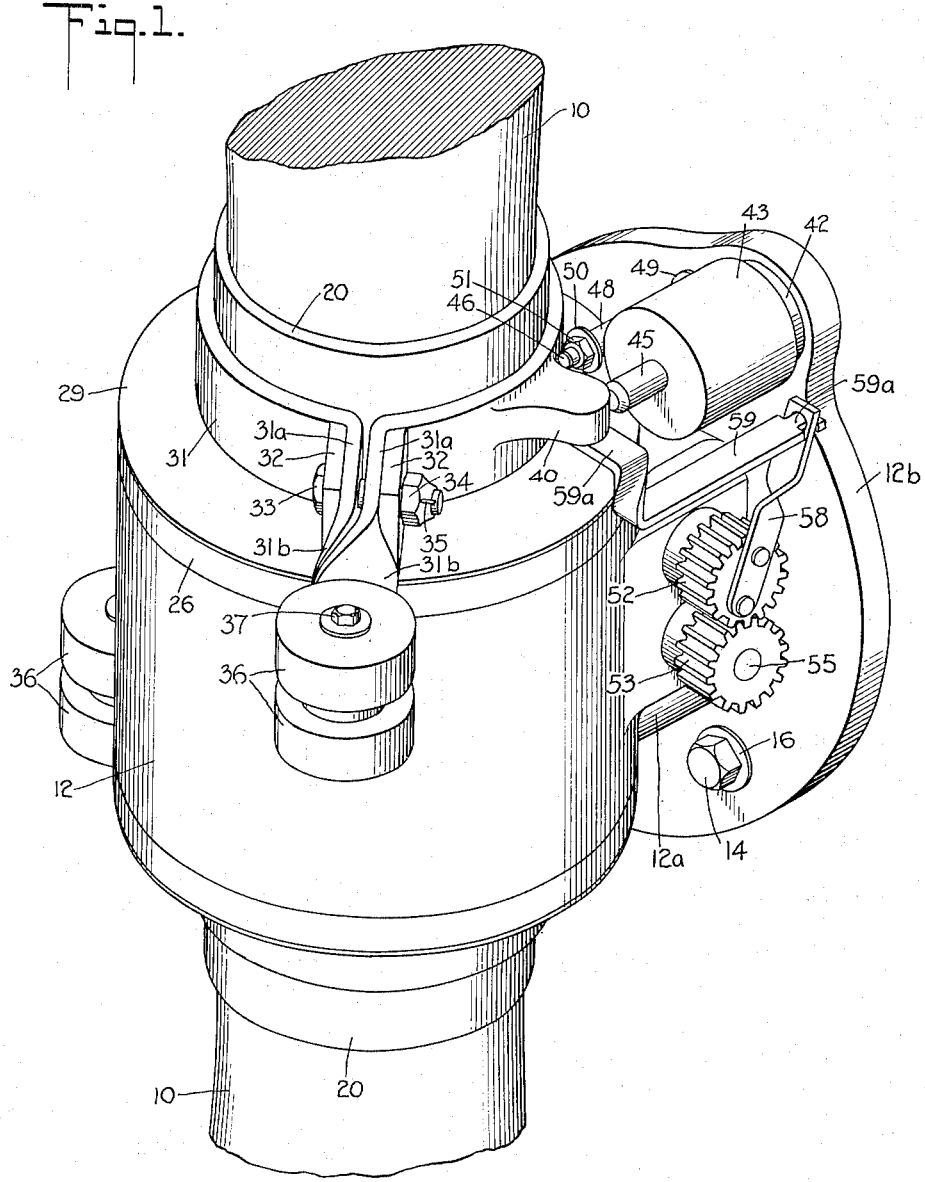

Jan. 29, 1952

E. M. HUGHES 2,584,018

CONTROLLABLE PITCH PROPELLER

Filed April 14, 1947

3 Sheets-Sheet 1

INVENTOR
EDWARD M. HUGHES

BY *Philip A. Mallinckrodt*
ATTORNEY

Jan. 29, 1952     E. M. HUGHES     2,584,018
CONTROLLABLE PITCH PROPELLER
Filed April 14, 1947     3 Sheets-Sheet 2
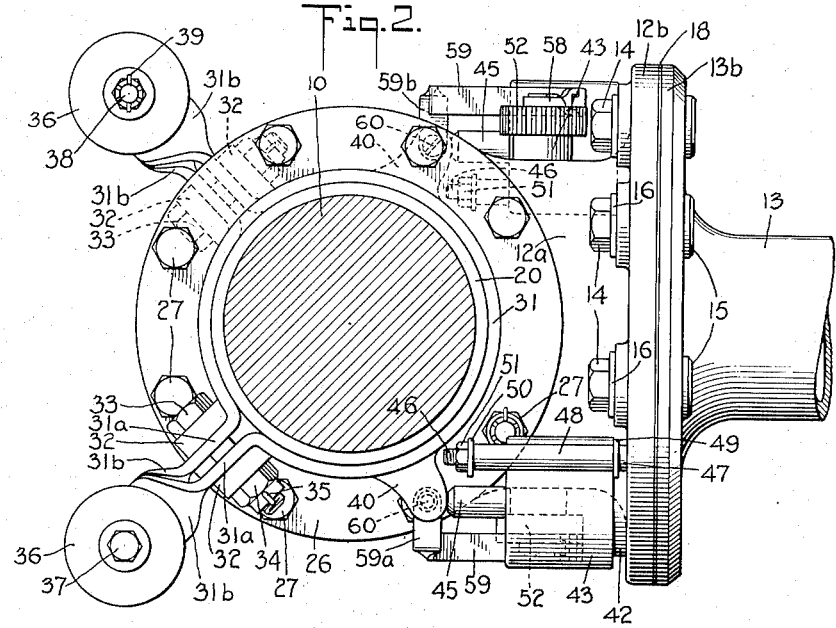
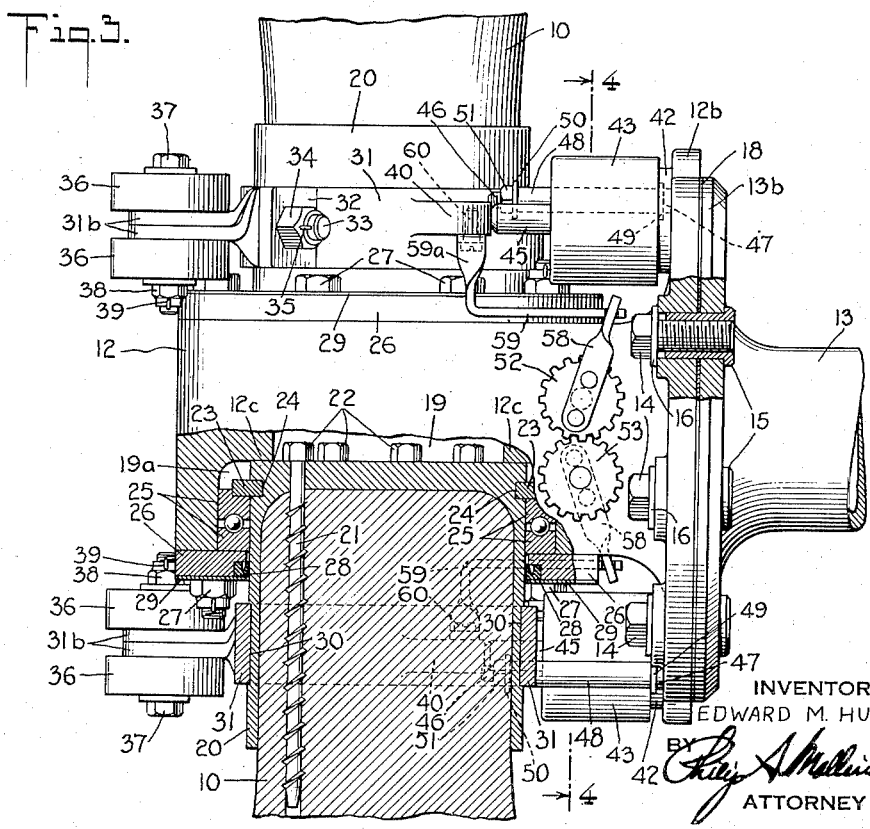
INVENTOR
EDWARD M. HUGHES
ATTORNEY Jan. 29, 1952        E. M. HUGHES        2,584,018
CONTROLLABLE PITCH PROPELLER
Filed April 14, 1947                                        3 Sheets—Sheet 3
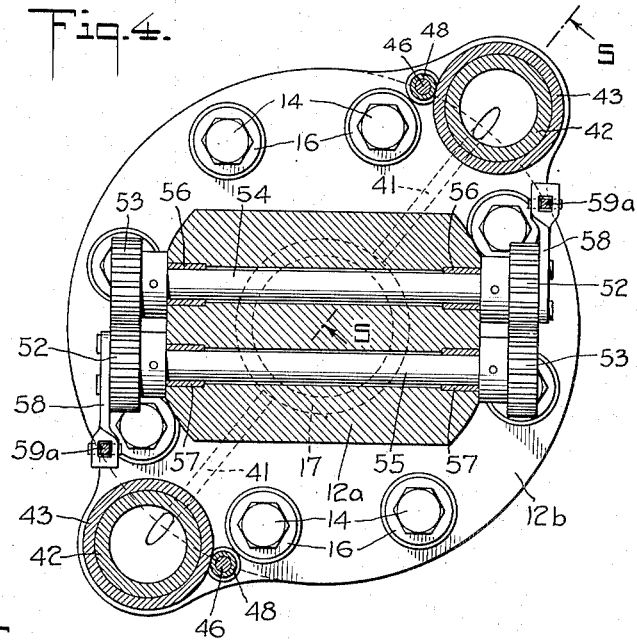
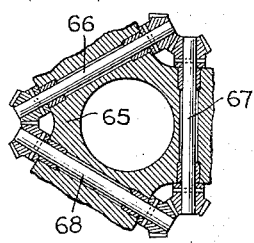
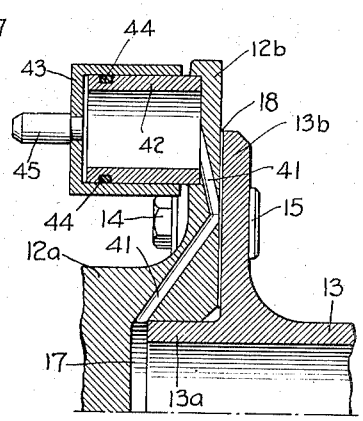
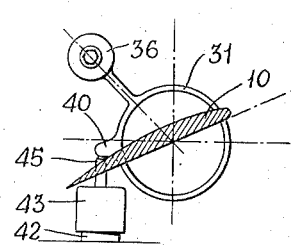
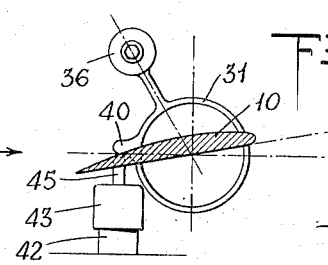
INVENTOR
EDWARD M. HUGHES
ATTORNEY Patented Jan. 29, 1952

2,584,018

UNITED STATES PATENT OFFICE 2,584,018

CONTROLLABLE PITCH PROPELLER

Edward M. Hughes, Lincoln Park, N. J.

Application April 14, 1947, Serial No. 741,350

8 Claims. (Cl. 170—160.31)

This invention relates to propellers for aircraft or the like, and particularly to propellers embodying mechanism for varying the pitch of the propeller blades during operation.

Such propellers are termed by the art "controllable pitch," as distinguished from "fixed pitch" wherein there is no provision made for altering the pitch angle of the propeller blades, and from "variable pitch" wherein such pitch angle can be adjusted only when the propeller is not operating, that is to say, can be adjusted only on the ground in instances where the propeller is associated with aircraft. "Controllable pitch" propellers on aircraft may be adjusted by the pilot during flight by means of suitable manual controls in the cockpit, or may be arranged for automatic so-called "constant-speed" operation.

Controllable pitch propellers of various constructions are well known, and are currently in widespread use on airplanes of both military and commercial types. Nevertheless, these are high precision products made up of a considerable number of parts necessarily very accurately finished to close tolerances, and are expensive to manufacture. For this reason primarily, they are not suitable for the small personal planes extensively used by amateur flyers and others. Yet there is great demand in the latter field for an inexpensive controllable pitch propeller, since a propeller whose pitch is variable during flight greatly increases the available power for take-off and increases operating efficiency at cruising and other speeds. Too, the small personal airplane is being rapidly improved, giving greater range between take-off and cruising speeds and making use of higher horsepower engines. The need for a suitable low-cost, controllable pitch propeller to accompany such advances in small plane design is critical.

Pursuant to my invention I provide a controllable pitch propeller of greatly improved construction, in that few operating parts are required and these need not be of high precision manufacture in the sense that present-day constructions require. Such parts may be produced in accordance with standard manufacturing practices, and may be assembled quickly and easily with the aid of only standard tools and equipment.

It is conventional in the art to employ counterweights for opposing the inherent blade torque which tends to correct the natural unbalance of a blade, it being understood that a propeller blade is unsymmetrical about its longitudinal axis so that its mass does not lie in the plane of rotation, and that when the propeller is turning at high speed each blade develops a torque tending to correct such unbalance and to turn the blade toward flat pitch. Such counterweights, as used with controllable pitch propellers, ordinarily supply a counter torque sufficiently greater than the natural twisting torque of the blade to automatically force the blade toward high pitch angle while the propeller is rotating. The actual pitch angle during flight is then controlled by the pilot, or automatically, by means of mechanism effective to reduce such high pitch angle as and when desired.

According to my invention the counterweights are attached to the butt portion of the blade (which is desirably sheathed by a suitable ferrule) by means of an adjustable ring clamp having a projecting arm. Such arm serves both as a strike member in determining the high pitch limit position automatically attained by the blade during flight and as a lever by which movement is imparted to the blade for reducing the pitch angle.

The actuating mechanism for reducing the blade pitch from its automatically attained maximum may take a variety of forms generally well known in the art, so long as the immediate motion-imparting member is adapted to coact with the projecting operating arm of the ring clamp. Preferably such actuating mechanism is a piston and cylinder arrangement adapted to be hydraulically operated by oil under pressure diverted from the lubricating system of the engine, a rigid pin projecting from the piston serving as the immediate motion-imparting member and, advantageously, also as a limit-stop, setting the high pitch limit for the blade.

The adjustable ring clamp and its component and associated members do not have to be held to close tolerances during manufacture, because the propeller blade angles can be aligned to compensate for manufacturing differences. Furthermore, the blade is always readily ground-adjustable to compensate for warping or other blade irregularities that might occur in use, by merely loosening the ring clamp and properly adjusting the blade relative to such ring clamp and to other parts of the mounting assembly.

Each blade of the propeller is identically equipped, and all are constrained to move in absolute synchronism, during any change of pitch, by means of a novel gear train and linkage operably connected to the respective ring clamps.

Because of the nature of the ring clamps, ground adjustment of any blade may be made without disturbing the blade synchronizing mechanism.

It is an object of the invention, then, to provide a controllable pitch propeller of low cost suitable for use with small airplanes.

It is an object to provide a controllable pitch propeller having relatively few, simply formed parts which are not of high precision character.

It is an object to provide, in the above, for quick and easy ground-adjustment of a propeller blade, where required to compensate for warpage or other blade irregularity, without disturbing the blade synchronizing mechanism.

It is an object to provide for relatively simple hydraulic control of the pitch angle of a propeller blade during flight.

It is an object to provide for relatively simple yet positive synchronization of blade movement in a multi-blade propeller during change of pitch angle of the blades.

It is a further object to accomplish all the above by mechanism not likely to get out of order nor requiring expensive maintenance.

These and other objects and features of the invention will be dealt with fully in the following detailed description of the preferred specific construction illustrated in the accompanying drawings.

In the drawings:

Fig. 1 represents a perspective view of a two-blade controllable pitch propeller in conformity with the invention, the actual blades being shown only fragmentarily;

Fig. 2, a top plan view;

Fig. 3, a side elevation partially in vertical section;

Fig. 4, a vertical section taken on line 4—4, Fig. 3;

Fig. 5, a fragmentary section taken on the line 5—5, Fig. 4;

Fig. 6, a view corresponding largely with that of Fig. 4 but illustrating the synchronizing gear assembly for a three-blade propeller;

Fig. 7, a similar view illustrating the synchronizing gear assembly for a four-bladed propeller;

Fig. 8, a diagrammatic section drawn to a reduced scale and taken transversely of the length of one of the blades of the propeller of Fig. 1 looking toward the hub, the propeller having its blades set at high pitch angle; and Fig. 9, a similar diagrammatic section showing, however, the propeller blades set at low pitch angle.

Referring to the drawings: in the preferred construction illustrated a pair of individual propeller blades respectively designated 10, radiate oppositely from a central hub 12 in which they have their mountings. The hub has a rearward extension 12a, flanged as at 12b for rigid securement to the flange 13b of a standard flanged engine shaft 13, the securement being advantageously made by a number of retaining bolts 14 threaded into respective retaining bushings 15, see Fig. 3, respective washers 16 being interposed therebetween. The flange 13b is set back relative to the propeller-receiving end of the engine shaft 13, thereby defining a shaft pilot portion 13a, see Fig. 5, which is received by a corresponding pilot bore 17 opening at the back face of the hub flange 12b and extending within the rearward portion 12a of the hub. A fluid-sealing gasket 18 is interposed between the flat meeting faces of the flanges 12b and 13b for a purpose hereinafter made clear.

The body proper of hub 12 is cylindrically formed transversely of its rotative axis and has flat parallel sides perpendicular to the cylindrical axis, see especially Fig. 3. It is concentrically bored completely therethrough, as shown at 19, and is counterbored from the said flat sides, as shown at 19a, to receive and properly position the blade mounting assemblies.

The propeller blades may be of any standard type as commonly fabricated of laminated wood, Duralumin, steel or the like. The illustrated blades 10 are of wood. To their butt end portions are secured respective ferrules 20 by means of a suitable number of blade hanger studs 21 and stud nuts 22. The ferrules 20 are cup shaped, and completely sheath the butt end portions of the blades. They are preferably steel forgings. The hanger studs 21 are specially designed, with elongated shanks and steep-pitch, wide lead threads, as shown. While such hanger studs are preferred, other means known to the art may be employed for securing the ferrules to wood blades, and in instances of metal or similar types of blades other appropriate known means are employed.

The blades 10, sheathed as they are at their butt ends by the ferrules 20, are received by and tightly retained in the counterbores 19a of the cylindrical body proper of the hub 12, the base of each resting firmly against the corresponding hub shoulder 12c but not being pressed so tightly thereagainst as to interfere with required rotation of the blade about the blade axis. For retaining the blades in the hub, respective snap rings 23 are positioned in corresponding annular grooves 24 provided circumferentially of the respective ferrules 20 adjacent the bases thereof. Respective thrust bearings 25 are fitted against such snap rings, and respective annular retaining caps 26 are tightly secured thereover and against the parallel flat sides of the hub by means of a suitable number of bolts 27 which extend through the thickness of the cylindrical body proper of the hub, as shown. Grease for lubricating the bearings is retained within the hub by means of seals 28, which are conveniently positioned in annular receiving grooves of respective retaining caps 26 by means of seal retaining rings 29.

It should be noted that adjustment of the bearing fit of each propeller blade within its receiving bore of the hub 12 may be made if and when required by adding or removing suitable shims (not shown) between the annular retaining caps 26 and the hub faces against which they fit.

Pursuant to the invention the counterweights are secured to a blade 10 by means of an adjustable ring clamp encircling the upper exposed portion of the ferrule 20. For this purpose the ferrule is desirably circumferentially stepped or grooved, as at 30, Fig. 3, for snugly receiving the ring clamp 31. Such ring clamp may be forged from strap steel to provide opposing clamping ears 31a and counterweight-receiving bracket extensions 31b. Advantageously, to insure against distortion, stiffener pieces 32 are welded to the outer faces of respective clamping ears 31a. A bolt 33 passes through suitably provided receiving openings in the clamping ears and stiffener pieces, and is cinched to proper tightness by means of a nut 34. A cotter pin 35 may be utilized to insure retention of the tight securement.

Appropriate counterweights 36 are secured to the bracket extensions 31b by means of a bolt and washer 37, nut 38, and cotter pin 39.

Secured to the outer circumferential surface of the ring clamp 31 at a predetermined location relative to the positioning of the counterweights 36 is an outwardly projecting arm 40, which is the operating or control arm through which the blade pitch angle is varied. Such arm is conveniently welded to the ring clamp 31, its position being thereby fixed relative to the counterweight bracket. It is preferred that the counterweight bracket be disposed in one quadrant of the ring clamp and associated propeller blade, while the operating arm 40 be disposed in an adjoining quadrant, see diagrammatic representations of Figs. 8 and 9. With such an arrangement, considering the ring clamp to be firmly clamped in place about the blade ferrule 20 of a blade 10, any approximately tangential pushing on the projecting operating arm 40 in the direction of the counterweight bracket and retained counterweights 36 will rotate the blade about its longitudinal axis to change the pitch angle of the blade in opposition to the action of the counterweights.

The counterweight-carrying, adjustable, ring clamp 31 is so positioned on the propeller blade, with respect to the latter's curvature, as to automatically cause the blade to assume a high pitch angle by the action of the counterweights under the influence of the centrifugal force of propeller rotation. Reduction of the blade pitch angle is then accomplished during flight by exerting pushing pressure on the operating arm 40 approximately tangential to the ring clamp, ferrule, and propeller blade, and in a direction toward the counterweight bracket and retained counterweights, see the diagrammatic representation of Fig. 9.

The pushing pressure on operating arm 40 is effectively accomplished by means of a hydraulic control system, in the illustrated instance utilizing oil under pressure diverted from the pressure lubricating system of the engine. Such hydraulic control systems are well known and are normally employed for a variety of control jobs in an airplane. They may be arranged for manual operation by the pilot from suitable controls disposed in the cockpit, or for automatic operation in accord with engine performance. However arranged, the general construction is well known and need not be detailed here. Suffice it to say that pressure fluid under suitable control is directed through the hollow engine shaft to the pilot bore 17 of the propeller hub 12, see Fig. 5. From there, according to the invention, it flows freely into respective passages 41 which communicate with the interiors of respective control cylinders 42. In this instance such control cylinders are mounted diametrically opposite each other on, and project from, the forward face of hub flange 12b, see Fig. 4. They are open at their forward ends, and are capped by respective externally fitting, concentric pistons 43 of cup formation, which telescope upon the said control cylinders. Introduction of pressure fluid to the control cylinders 42 through respective flow passages 41 will cause the pistons 43 to move forward relative to their respective cylinders. For fluid-sealing purposes ring gaskets 44, Fig. 5, are provided in circumferential receiving grooves which are defined in the exterior walls of the respective cylinders. It should be noted here that gasket 18, interposed between the face-to-face flanges 12b and 13b seals the elbow openings of flow passages 41.

Each piston 43 is equipped with an outwardly extending actuating pin 45 centrally of its closed cup end. These are the immediate motion-imparting members operative on the operating arms 40 of the respective adjustable ring clamps 31.

For establishing the range of variability of blade pitch angle and for enabling such range to be extended or contracted when required without major alterations in the device, a limit-stop assembly is provided for each piston 43. This advantageously comprises a bolt 46 anchored at one end in hub flange 12b and projecting from the forward face thereof immediately adjacent to and substantially parallel with one of the cylinder and piston assemblies 42 and 43. Mounted on such bolt 46 and suitably positioned by means of spacers 47 and 48 are respective stop elements 49 and 50. The spacers 47 and 48 are conveniently lengths of tubing dimensioned to snugly encircle the shank of bolt 46 and to properly position the stop elements 49 and 50 relative to the ends of the adjacent piston 43. Such stop elements are conveniently washers which fit over the shank of bolt 46 and extend into the path of reciprocating movement of piston 43 as limit stops. A nut 51 threaded on the free end of the bolt holds both the spacers and stop elements in proper relative positions.

If and when it is desired to increase or decrease the range of possible blade pitch angle variation, as would be true, for example, if a plane were customarily operated in a vicinity of one altitude relative to sea level and then were taken to a vicinity of far different altitude relative to sea level, then spacers of suitably changed relative lengths would be substituted for the illustrated spacers 49 and 50, the operation involving nothing more than removing the nut 51 before, and replacing it after the substitution.

It should be noted that while the above-described adjustable stop assembly determines the range of possible propeller blade pitch angle variation and acts to positively establish the upper and lower pitch angle limit positions, the pins 45 of respective pistons 43 actually serve as limit stops for the blade operating arms 40 of respective blade ring clamps 31. Thus, when the hydraulic control system is not directing pressure fluid into cylinders 42 for the purpose of pushing the respective pistons 43 and associated actuating pins 45 forwardly to lessen the pitch of the propeller blades, such pistons and associated actuating pins are at their rear limit positions determined by the respective stop elements 49, and operating arms 40 of respective blade ring clamps 31, functioning as striker elements, are pressed firmly thereagainst during operation of the propeller, by reason of centrifugal force acting on the respective sets of counterweights 36. The propeller blades are then at their highest pitch, and are so maintained during operation until progressive introduction of fluid into the respective cylinders 42 progressively reduces the blade pitch angle for cruising flight. When the controls of the hydraulic system are moved so that fluid discharge from such cylinders 42, the blades again seek high pitch to the extent permitted by the respective pins 45. In this manner the propeller blades may be controlled as desired during all phases of plane operation.

So that all blades of the propeller will maintain exactly the same pitch angle at all times and will move in synchronism during any and all changes of pitch angle, blade synchronizing means are provided. As illustrated, such means preferably takes the form of a simple gear train linked to the respective operating arms 40. In some instances, it may be desirable to link such gear train to other parts of the respective ring clamps. Such gear train comprises respective pairs of intermeshing spur gears 52 and 53 fixed to opposite ends of respective shafts 54 and 55. The shafts extend through the rearward extension 12a of propeller hub 12, projecting at opposite sides thereof, and are journaled by respective sets of bushings 56 and 57, see Fig. 4. To the gears 52 of said pairs are fixed, as by means of suitable rivets, respective linkage arms 58 whose free ends are slotted for receiving the headed slide ends 59a of respective links 59. The opposite end portions 59b of such links 59 are twisted to extend into the proximity of respective operating arms 40 of the ring clamps, and are pivotally connected with such arms as by means of respective pivot pins 60.

In instances where the propeller has more than two blades, the construction of the invention is adapted thereto by adding units of equipment in accordance with the number of additional blades. For example, as illustrated in Fig. 6 in the instance of a three-bladed propeller, and in Fig. 7, in the instance of a four-bladed propeller, the hubs are appropriately formed to receive the additional propeller blades and associated equipment. The hub 65 in Fig. 6 has three branches, through each of which extends a blade synchronizing shaft, the three shafts being indicated 66, 67 and 68, respectively. The hub 70 in Fig. 7 has four branches, through each of which extends a blade synchronizing shaft, the four shafts being indicated 71, 72, 73 and 74, respectively. The remainder of the operating equipment in both instances is positioned accordingly, as will be apparent to those skilled in the art. From the several instances given it will be seen that the blade synchronizing shafts of any installation are, in effect, arranged in a closed loop, pairs of intermeshing gears being fixed to respective sets of adjoining shaft ends.

The novel fluid-operated mechanism here disclosed is especially advantageous in connection with the blade ring clamps and simplified blade synchronizing mechanism of the invention. Nevertheless, mechanical or other types of actuating and control systems may also be employed, if desired, to actuate the blade operating arms of the ring clamps. So too, other known types of synchronizing means may replace that here disclosed without rendering the adjustable ring clamps inapplicable.

Whereas the invention is here illustrated and described with respect to a preferred specific construction thereof, it should be understood that various changes may be made in such construction and various other constructions may be produced on the basis of the teachings hereof by those skilled in the art, without departing from the spirit and generic scope of the invention as defined by the following claims.

I claim:

1. In a controllable pitch propeller which includes individually adjustable blades mounted in a rotatable hub, adjustable ring clamps fastened to the butt end portions of respective blades, counterweights carried by said adjustable ring clamps, and operating arms extending from said adjustable ring clamps at predetermined positions relative to said counterweights, the combination of actuating means disposed exteriorly of said hub and in proximity to the respective operating arms, for turning said blades about their respective blades axes to vary the blade pitch angles thereof; means for operating said actuating means; and synchronizing means constraining the respective blades to move in synchronism during blade pitch angle adjustment, said synchronizing means comprising intermeshed gearing mounted on shafts extending through said hub, and sets of linkage articulatively connecting said gearing and shafts with respective ring clamps.

2. The combination recited in claim 1 wherein an operating arm extends from each of said adjustable ring clamps into the line of action of corresponding actuating means, and wherein said sets of linkage are connected to respective operating arms.

3. In a controllable pitch propeller having individually adjustable blades mounted in a rotatable hub, adjustable ring clamps fastened to the butt end portions of respective blades; counterweights carried by said adjustable ring clamps; operating arms extending from said adjustable ring clamps at predetermined positions relative to said counterweights; actuating means associated with and operative on respective operating arms for turning said blades about their respective blade axes to vary the blade pitch angles thereof; means for operating said actuating means; and synchronizing means constraining the respective blades to move in synchronism during blade pitch angle adjustment, said synchronizing means comprising respective blade-synchronizing shafts in number corresponding to the number of propeller blades and journaled in said hub in a closed loop arrangement, pairs of intermeshing gears fixed to adjoining ends of said shafts, and linkage connecting each of the adjustable ring clamps to one of the said intermeshing gears of an adjacent pair.

4. A controllable pitch propeller assembly, comprising a rotatable hub having a plurality of radially arranged propeller-blade-receiving sockets, a rearwardly extending body portion, and a mounting flange extending outwardly at the rear of said body portion; respective propeller blades secured in said sockets for individual pitch-varying movements; adjustable ring clamps fastened to the butt end portions of respective blades adjacent the socket mountings thereof; counterweights carried by the respective ring clamps, said counterweights being sufficiently large to constantly urge the propeller blades toward increased pitch position under the action of the centrifugal force of propeller rotation; operating arms extending from said adjustable ring clamps at predetermined positions relative to said counterweights; respective actuating piston and cylinder assemblies positioned on said mounting flange, the pistons of said assemblies having portions which project into abutting relationship with said operating arms of the respective ring clamps to define variable operating pitch positions for said propeller blades; means for operating said pistons to bring them into desired pitch positions; and synchronizing means interconnecting the respective ring clamps, said cynchronizing means being positioned in said rearwardly extending body portion of the rotatable hub.

5. The combination recited in claim 4, wherein studs project forwardly in proximity to respective piston and cylinder assemblies from mountings in said flange, and limit-stop members are adjustably positioned on said studs, said members projecting into the path of action of said respective piston and cylinder assemblies.

6. In a controllable pitch propeller having individually adjustable blades mounted in a rotatable hub, adjustable ring clamps fastened to the butt end portions of respective blades; counterweights carried by said adjustable ring clamps; operating arms extending from said adjustable ring clamps at predetermined positions relative to said counterweights; actuating means associated with and operative on respective operating arms for turning said blades about their respective blade axes to vary the blade pitch angles thereof, said actuating means including members arranged in abutting but unconnected relationship with the respective operating arms, as pushers, so as to be operative upon said arms in opposition to the action of the counterweights, and so as to otherwise serve as respective limit-stops for said operating arms against return of said blades under the urge of centrifugal force acting on said counterweights; means for operating said actuating means; synchronizing means constraining the respective blades to move in synchronism during blade pitch angle adjustment; and ground-adjustable, limit-stop assemblies fixed to said hub and extending into the path of action of the respective actuating means, for variably setting both upper and lower limits of blade pitch angle variation.

7. The combination recited in claim 6 wherein actuating means comprise respective fluid-operated cylinder and piston assemblies, the piston of each embodying an outwardly-projecting element arranged to abut against the said operating arm with which it is associated.

8. In a controllable pitch propeller having individually adjustable blades mounted in a rotatable hub, adjustable ring clamps fastened to the butt end portions of respective blades; counterweights carried by said adjustable ring clamps; operating arms extending from said adjustable ring clamps at predetermined positions relative to said counterweights; actuating means associated with and operative on respective operating arms for turning said blades about their respective blade axes to vary the blade pitch angles thereof, said actuating means comprising respective piston and cylinder assemblies mounted on said hub, the piston of each being of cup-formation telescoped over the cylinder and having a member arranged to abut against its associated operating arm; means for operating said piston and cylinder assembly; synchronizing means constraining the respective blades to move in synchronism during blade pitch angle adjustment; and respective ground-adjustable, limit-stop means fixed to said hub in proximity to the respective piston and cylinder assemblies, said limit-stop means each comprising adjustably spaced stop members arranged to respectively engage the front and rear ends of its associated piston to limit the reciprocative stroke thereof.

EDWARD M. HUGHES.

REFERENCES CITED

The following references are of record in the file of this patent:

UNITED STATES PATENTS

| Number | Name | Date |
| --- | --- | --- |
| 1,550,550 | McCauley | Aug. 18, 1925 |
| 1,936,677 | Kozub | Nov. 28, 1933 |
| 1,987,651 | Wiegand | Jan. 15, 1935 |
| 2,032,254 | Caldwell | Feb. 25, 1936 |
| 2,032,255 | Caldwell | Feb. 25, 1936 |
| 2,147,078 | Barish | Feb. 14, 1939 |
| 2,308,228 | Matteucci | Jan. 12, 1943 |
| 2,498,110 | Lathrem | Feb. 21, 1950 |

FOREIGN PATENTS

| Number | Country | Date |
| --- | --- | --- |
| 27,987 | Great Britain | 1913 |
| 350,257 | Italy | July 8, 1937 |